(12) United States Patent
Akamatsu (10) Patent No.: US 10,419,622 B2
(45) Date of Patent: Sep. 17, 2019

(54) IMAGE READING DEVICE AND IMAGE FORMING APPARATUS INCLUDING THE SAME (71) Applicant: KYOCERA Document Solutions Inc., Osaka (JP)

(72) Inventor: Shinji Akamatsu, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/093,811

(22) PCT Filed: Dec. 28, 2017

(86) PCT No.: PCT/JP2017/047384
§ 371 (c)(1),
(2) Date: Oct. 15, 2018

(87) PCT Pub. No.: WO2018/131525
PCT Pub. Date: Jul. 19, 2018

(65) Prior Publication Data
US 2019/0141200 A1 May 9, 2019

(30) Foreign Application Priority Data
Jan. 16, 2017 (JP) ................................. 2017-004970

(51) Int. Cl.
H04N 1/04 (2006.01)
H04N 1/00 (2006.01)
(Continued)

(52) U.S. Cl.
CPC ......... H04N 1/00018 (2013.01); G01V 3/081 (2013.01); G03B 27/62 (2013.01);
(Continued)

(58) Field of Classification Search
CPC .......... H04N 1/00018; H04N 1/00037; H04N 1/00551; H04N 1/04; H04N 1/10; G01V 3/081; G03B 27/62
(Continued)

(56) References Cited

U.S. PATENT DOCUMENTS 5,754,042 A * 5/1998 Schroeder ................ G01B 7/30
324/207.21
5,801,462 A * 9/1998 Yagoto ................... H02K 41/03
310/12.04
(Continued)

FOREIGN PATENT DOCUMENTS

JP 2000-115455 4/2000
JP 2006-87008 3/2006
(Continued)

OTHER PUBLICATIONS

International Search Report dated Mar. 20, 2018 in corresponding International Application No. PCT/JP2017/047384.

Primary Examiner — Cheukfan Lee
(74) Attorney, Agent, or Firm — Wenderoth, Lind & Ponack, L.L.P.

(57) ABSTRACT

An image reading device includes a rotating magnet unit (42) that rotates in interlock with opening and closing of a document pressing unit (2) and has a magnetic pole of an N pole and a magnetic pole of a S pole disposed at different phase positions in a rotation direction, a magnetic sensor (43) having a magnetic detection part (43a) that is installed in a reading unit or a movable body moving in a sub-scanning direction in interlock with the reading unit, and faces a peripheral surface of the rotating magnet unit (42) only when the reading unit is in a predetermined home position, and a determination unit that determines an opening and closing state of the document pressing unit (2) and
(Continued)

determines whether the reading unit is in the predetermined home position on the basis of an output signal from the magnetic sensor (43).

4 Claims, 7 Drawing Sheets

(51) Int. Cl.
*H04N 1/10* (2006.01)
*G01V 3/08* (2006.01)
*G03B 27/62* (2006.01)

(52) U.S. Cl.
CPC ..... *H04N 1/00037* (2013.01); *H04N 1/00551* (2013.01); *H04N 1/04* (2013.01); *H04N 1/10* (2013.01)

(58) Field of Classification Search
USPC ........................................ 358/474, 497, 496
See application file for complete search history.

(56) References Cited

U.S. PATENT DOCUMENTS

| | | | |
|---|---|---|---|
| 6,456,063 B1 * | 9/2002 | Moreno | G01D 3/021 |
| | | | 324/167 |
| 9,739,640 B2 * | 8/2017 | Aichriedler | G01R 21/08 |
| 2006/0061834 A1 | 3/2006 | Nonaka | |
| 2010/0053706 A1 * | 3/2010 | Jasinski | H04N 1/00018 |
| | | | 358/498 |
| 2014/0333976 A1 | 11/2014 | Hyun | |

FOREIGN PATENT DOCUMENTS

| | | |
|---|---|---|
| JP | 2013-85047 | 5/2013 |
| JP | 2014-220684 | 11/2014 |
| JP | 2016-104118 | 6/2016 |

\* cited by examiner

ND IMAGE FORMING APPARATUS INCLUDING THE SAME

IMAGE READING DEVICE AND IMAGE FORMING APPARATUS INCLUDING THE SAME

TECHNICAL FIELD

The present invention relates to an image reading device and an image forming apparatus including the same.

BACKGROUND ART

In the related art, there has been known an image reading device that optically reads an image of a document placed on a contact glass by a reading unit and outputs image data (for example, see Patent Literature 1).

The contact glass is mounted on an upper surface of a scanner housing. The reading unit is received in the scanner housing. The reading unit is installed with a light source that irradiates light toward the document on the contact glass. The reading unit is provided below the contact glass so as to be movable in a sub-scanning direction.

The movement of the reading unit is controlled by a controller. At the time of reading of the document image, the reading unit is moved by the controller from a home position to a moving end set in advance, light reflected from the document is subjected to photoelectric conversion by an image sensor (for example, a CIS sensor, a CCD sensor and the like) during the movement, and the image is read. When the reading operation for the document image is ended, the reading unit is returned to the home position by the controller. In the vicinity of the home position in the scanner housing, a position sensor is normally provided to detect that the reading unit is located at the home position. The position sensor, for example, is configured by a PI sensor.

Furthermore, the scanner housing is mounted with a document pressing unit that is opened and closed with respect to an upper surface of the contact glass, and closed to press the document on the contact glass. The scanner housing is provided therein with an opening and closing detection sensor for detecting the opening and closing of the document pressing unit. The opening and closing detection sensor performs the opening and closing detection by detecting a lower end part of a rod-like member that slides in an up and down direction in interlock with the opening and closing of the document pressing unit.

CITATION LIST

Patent Literature

Patent Literature 1: Japanese Unexamined Patent Application Publication No. 2013-085047

SUMMARY OF INVENTION

Technical Problem

However, in the related image reading device disclosed in the Patent Literature 1, it is necessary to separately provide the position sensor for detecting that the reading unit is located at the home position and the opening and closing detection sensor for detecting the opening and closing of the document pressing unit. Therefore, the number of sensors to be used is increased, resulting in an increase in cost.

The present invention has been made to solve the aforementioned problems, and an object of the present invention is to provide an image reading device which can be used in common for a detection unit for detecting whether a reading unit is located at a home position and a detection unit for detecting an opening and closing state of a document pressing unit.

Solution to Problem

An image reading device according to the present invention includes a scanner housing, a contact glass mounted on an upper surface of the scanner housing, a reading unit, which is received in the scanner housing, is installed with a light source for emitting light toward a document on the aforementioned contact glass, and reciprocally moves between a predetermined home position and a predetermined moving end, and a document pressing unit, which is opened and closed with respect to an upper surface of the aforementioned contact glass and is closed to press the document on the contact glass.

The image reading device further includes a rotating magnet unit that rotates in interlock with opening and closing of the aforementioned document pressing unit and has a magnetic pole of an N pole and a magnetic pole of a S pole disposed at different phase positions in a rotation direction, and a magnetic sensor having a magnetic detection part that is installed in the aforementioned reading unit or a movable body moving in a sub-scanning direction in interlock with the reading unit, and faces a surface of the aforementioned rotating magnet unit only when the aforementioned reading unit is in the aforementioned predetermined home position, wherein the magnetic poles of the N pole and the S pole of the aforementioned rotating magnet unit are provided such that a polarity of the magnetic pole of the N pole or the S pole facing the aforementioned magnetic detection part is different between when the aforementioned document pressing unit is in a closed state and when the aforementioned document pressing unit is in an opened state in a state in which the aforementioned reading unit is in the aforementioned predetermined home position, and the image reading device further includes a determination unit that determines an opening and closing state of the aforementioned document pressing unit and determines whether the aforementioned reading unit is in the aforementioned predetermined home position on the basis of an output signal from the aforementioned magnetic sensor.

An image forming apparatus according to the present invention includes the aforementioned image reading device.

Advantageous Effects of Invention

According to the present invention, one magnetic sensor can be used in common for a detection unit for detecting whether a reading unit is located at a home position and a detection unit for detecting the opening and closing of a document pressing unit.

DESCRIPTION OF EMBODIMENTS

Hereinafter, embodiments of the present invention will be described in detail on the basis of the drawings. It is noted that the present invention is not limited to the following embodiments.

Figure 1:
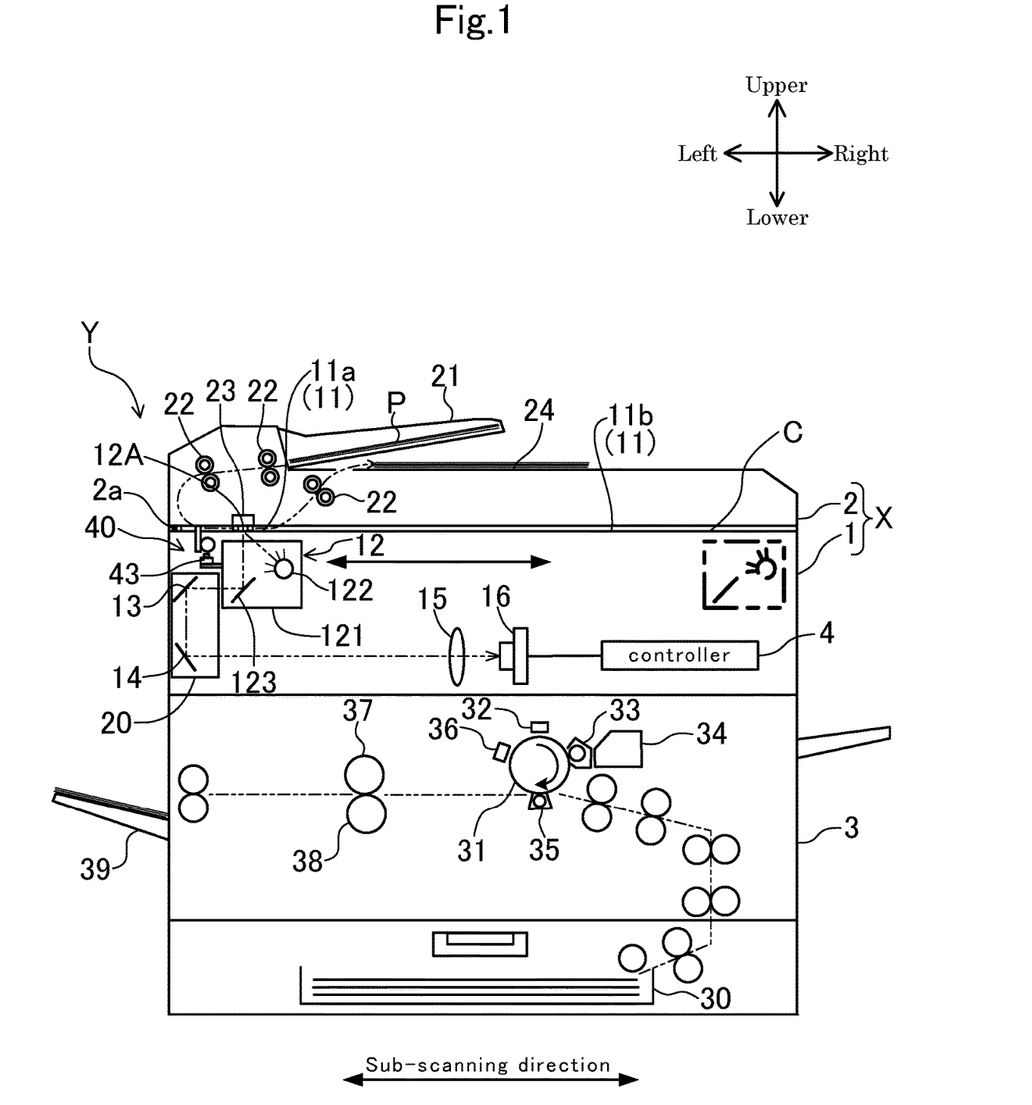
FIG. 1 is a schematic diagram illustrating an image forming apparatus including an image reading device in an embodiment.

FIG. 1 illustrates a multifunctional peripheral Y including an image reading device X in an embodiment. The multifunctional peripheral Y includes an image reading unit 1, an ADF (a document pressing unit) 2, an image forming unit 3, a controller (a determination unit) 4, an operation unit (not illustrated) and the like. The image reading device X is configured by the image reading unit 1 and the ADF 2. The image reading device X has a detection device 40 that detects an opening and closing state of the ADF 2 and a home position of a reading unit 12 to be described later. In the following description, it is assumed that a front side and a rear side indicate a front side and a back side in a direction vertical to the paper surface of FIG. 1, and a left side and a right side indicate a left side and a right side when the multifunctional peripheral Y is viewed from the front side.

The multifunctional peripheral Y is an electrophotographic image forming apparatus that forms an image on a sheet on the basis of image data read by the image reading unit 1 or image data inputted from an information processing apparatus such as an external personal computer.

The image forming unit 3 includes a sheet feeding cassette 30, a photosensitive drum 31, a charging device 32, a developing device 33, a toner container 34, a transfer roller 35, an electricity removing device 36, a fixing roller 37, a pressure roller 38, a sheet discharge tray 39 and the like.

In the image forming unit 3, an image is formed on a sheet, which is supplied from the sheet feeding cassette 30, in the following procedure. Specifically, firstly, the photosensitive drum 31 is uniformly charged to a predetermined potential by the charging device 32. Next, light based on image data is irradiated onto a surface of the photosensitive drum 31 by a laser scanning unit (LSU; not illustrated). In this way, an electrostatic latent image is formed on the surface of the photosensitive drum 31. Then, the electrostatic latent image on the photosensitive drum 31 is developed by the developing device 33 as a toner image. Toner is replenished to the developing device 33 from the toner container 34.

The toner image formed on the photosensitive drum 31 is transferred on a sheet by the transfer roller 35. Thereafter, the toner image transferred on the sheet is heated, melted, and fixed in the fixing roller 37 when the sheet passes through between the fixing roller 37 and the pressure roller 38. The potential of the photosensitive drum 31 is removed in the electricity removing device 36.

The image reading unit 1 includes a contact glass 11, the reading unit 12, mirrors 13 and 14, an optical lens 15, and a CCD sensor 16.

The contact glass 11 is mounted on an upper wall part of a scanner housing C constituting an outer wall of the image reading unit 1. The contact glass 11 includes a first contact glass 11a, which is used at the time of image reading by a sheet-through scheme to be described later, and a second contact glass 11b which is used at the time of image reading by a fixing scheme. The first contact glass 11a has a rectangular plate shape long in a front and rear direction (a direction perpendicular to a document conveyance direction) and is mounted on a left end part of the upper wall part of the scanner housing C. The second contact glass 11b has a rectangular plate shape long in a right and left direction and is disposed at a right side of the first contact glass 11a.

The reading unit 12 is received in the scanner housing C. The reading unit 12 has a first carriage 121 movable in a sub-scanning direction (the right and left direction of FIG. 1). The first carriage 121 is installed with a LED light source 122 and a mirror 123. The first carriage 121 is driven in the sub-scanning direction by a driving mechanism (not illustrated) using a driving motor such as a stepping motor. When the first carriage 121 (the reading unit 12) is moved in the sub-scanning direction by the driving motor, light irradiated to the contact glass 11 from the LED light source 122 is scanned in the sub-scanning direction.

The mirror 123 reflects, toward the mirror 13, reflected light when light has been irradiated from the LED light source 122 to a document P passing through a reading position 12A. The light reflected by the mirror 123 is lead to the optical lens 15 by the mirrors 13 and 14. The mirrors 13 and 14 are installed in a second carriage (a movable body) 20. The second carriage 20 moves in the sub-scanning direction at a half speed of the first carriage 121 at the time of a reading operation by a sheet fixing scheme to be described later.

The optical lens 15 collects incident light and causes the light to be incident on the CCD sensor 16. The CCD sensor 16 converts the reflected light from the document image into analog image data through photoelectric conversion and outputs the analog image data to the controller 4.

The controller 4 is a part that controls an overall operation of the image reading device X and includes a microcomputer having a CPU, a ROM, and a RAM. The controller 4 generates digital data of the document image on the basis of the analog image data received from the CCD sensor 16, and stores the digital data in the ROM.

The ADF 2 is an automatic document feeding device including a document feeding tray 21, a plurality of conveying rollers 22, a guide member 23, and a sheet discharge tray 24. The ADF 2 is supported to a left side edge of an upper surface of the scanner housing C via a shaft 2a. The ADF 2 is openable and closable with respect to the contact glass 11 by rotating around the shaft 2a.

In the ADF 2, each of the conveying rollers 22 is driven by a motor (not illustrated), so that the document P set on the document feeding tray 21 is supplied and conveyed to the reading position 12A on the first contact glass 11a at a predetermined time interval. The document P passing through the reading position 12A is discharged to the sheet discharge tray 24.

A reading scheme of the document image by the image reading device X includes two schemes of a sheet-through scheme and a fixing scheme. In the sheet-through scheme, the reading unit 12 is made stationary below the reading position 12A on the first contact glass 11a, and in that state, the document P is supplied and conveyed toward a space between the guide member 23 and the first contact glass 11a by the ADF 2. By so doing, the document P is moved and conveyed from one side to the other side in the sub-scanning direction with respect to the reading position 12A, so that the image of the document P is read.

On the other hand, in an image reading operation according to the sheet fixing scheme, the reading unit 12 is moved from a predetermined home position to a predetermined moving end in a state in which the document P has been fixed on the second contact glass 11b, so that the image of the document P is read. After the reading of the document image is ended, the reading unit 12 is returned to the home position by the driving motor. The home position of the reading unit 12, for example, is set directly below the first contact glass 11a. The moving end of the reading unit 12, for example, is set directly below the right side end part of the second contact glass 11b (see a thick two dot chain line of FIG. 1). In the sheet fixing scheme, the ADF 2 serves as a document pressing unit that presses a document on the second contact glass 11b.

The image reading device X has the detection device 40 that detects the home position of the reading unit 12 and the opening and closing of the ADF 2 as described above.

Figure 2:
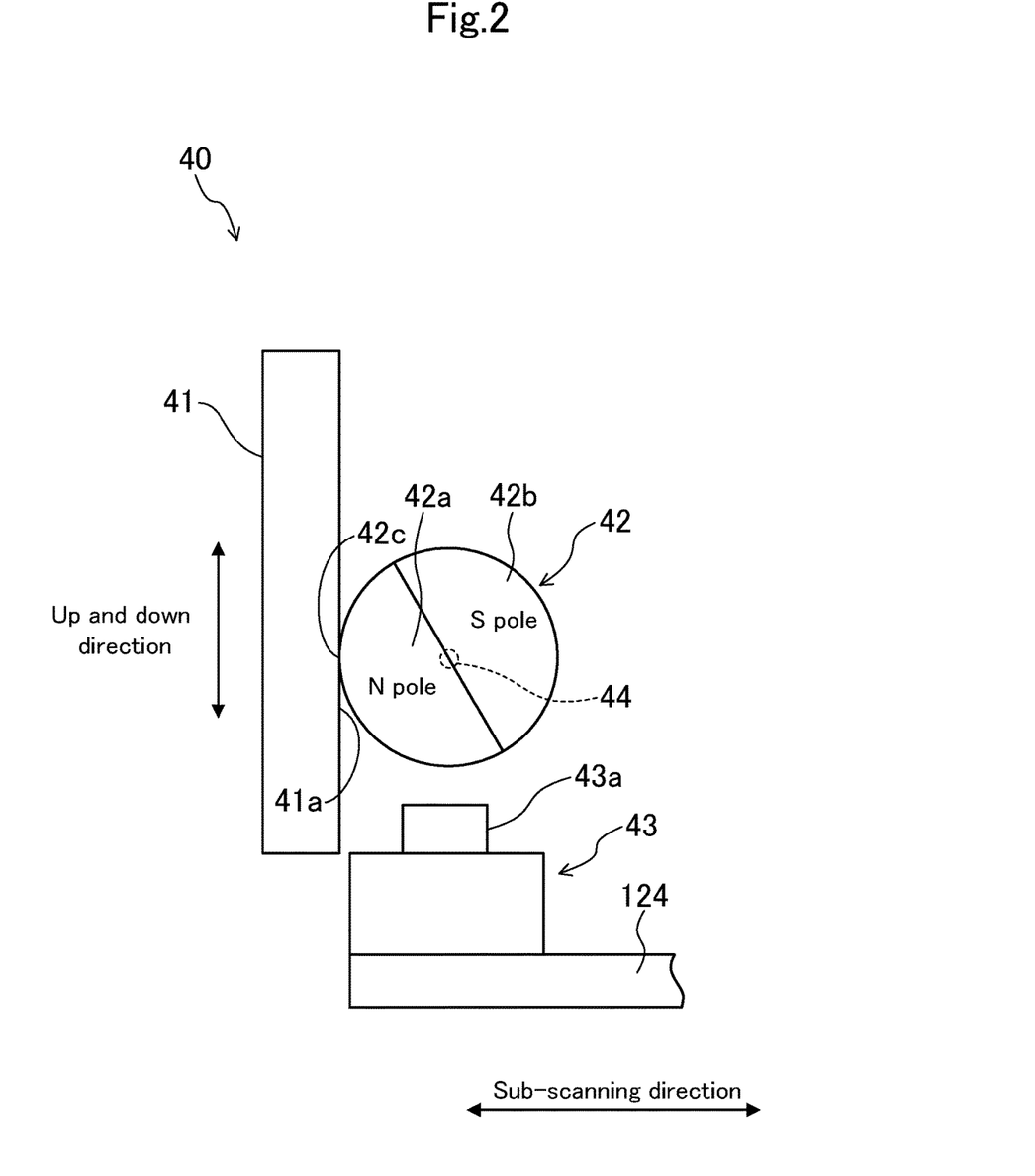
FIG. 2 is a schematic diagram illustrating a detection device installed in an image reading device and is a diagram illustrating a state in which a reading unit is located at a home position and a document pressing cover is closed.
Figure 3:
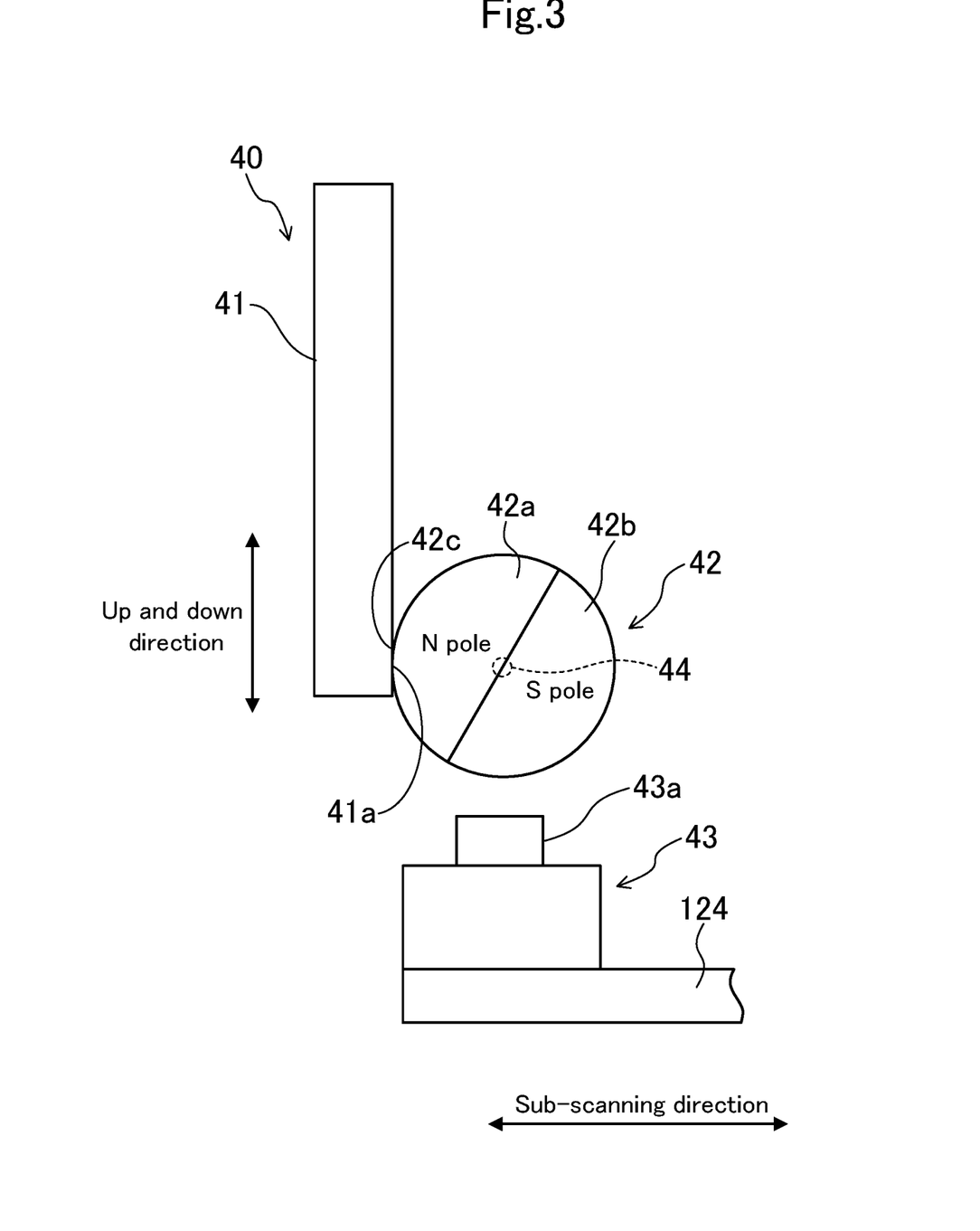
FIG. 3 is a diagram corresponding to FIG. 2, which illustrates a state in which a reading unit is located at a home position and a document pressing cover is opened.

As illustrated in FIG. 2 and FIG. 3, the detection device 40 has an interlocking bar 41, a rotating magnet unit 42, and a magnetic sensor 43. The rotating magnet unit 42 rotates in interlock with the opening and closing of the ADF 2. FIG. 2 illustrates a case where the ADF 2 is in a closed state and FIG. 3 illustrates a case where the ADF 2 is in an opened state. As illustrated in each diagram, the interlocking bar 41 includes a plate-like member extending in an up and down direction. An upper end part of the interlocking bar 41 is connected to the ADF 2 via a gear mechanism (not illustrated) by passing through the upper wall part of the scanner housing C. When the ADF 2 is rotated upward (to an opening side) around the shaft 2a, the interlocking bar 41 also moves upward, and when the ADF 2 is rotated downward (to a closing side) around the shaft 2a, the interlocking bar 41 also moves downward. At a lower end part of the interlocking bar 41, a gear part 41a, which includes a plurality of teeth arranged in the up and down direction, is formed. The gear part 41a is engaged with a gear part 42c formed on a peripheral surface of the rotating magnet unit 42.

The rotating magnet unit 42 has a disc shape in which an axis center extends in the front and rear direction. The rotating magnet unit 42 is fixed to one end of a support shaft 44 extending in the front and rear direction. The support shaft 44 is disposed coaxially with the rotating magnet unit 42 and is supported to be rotatable by a bearing (not illustrated). The rotating magnet unit 42 is rotatable in a circumferential direction together with the support shaft 44. The rotating magnet unit 42 has a magnetic pole 42a of an N pole and a magnetic pole 42b of a S pole. The two magnetic poles 42a and 42b are disposed to face each other when viewed from a rotation axis direction of the rotating magnet unit 42. In other words, the two magnetic poles 42a and 42b are disposed at different phase positions (phase positions opposite to each other by 180°) in the rotation direction of the rotating magnet unit 42. The rotating magnet unit 42 is formed on the peripheral surface thereof with the gear part 42c engaged with the gear part 41a of the interlocking bar 41. The vertical movement of the interlocking bar 41 is converted into the rotation operation of the rotating magnet unit 42 via the two gear parts 41a and 42c.

Figure 4:
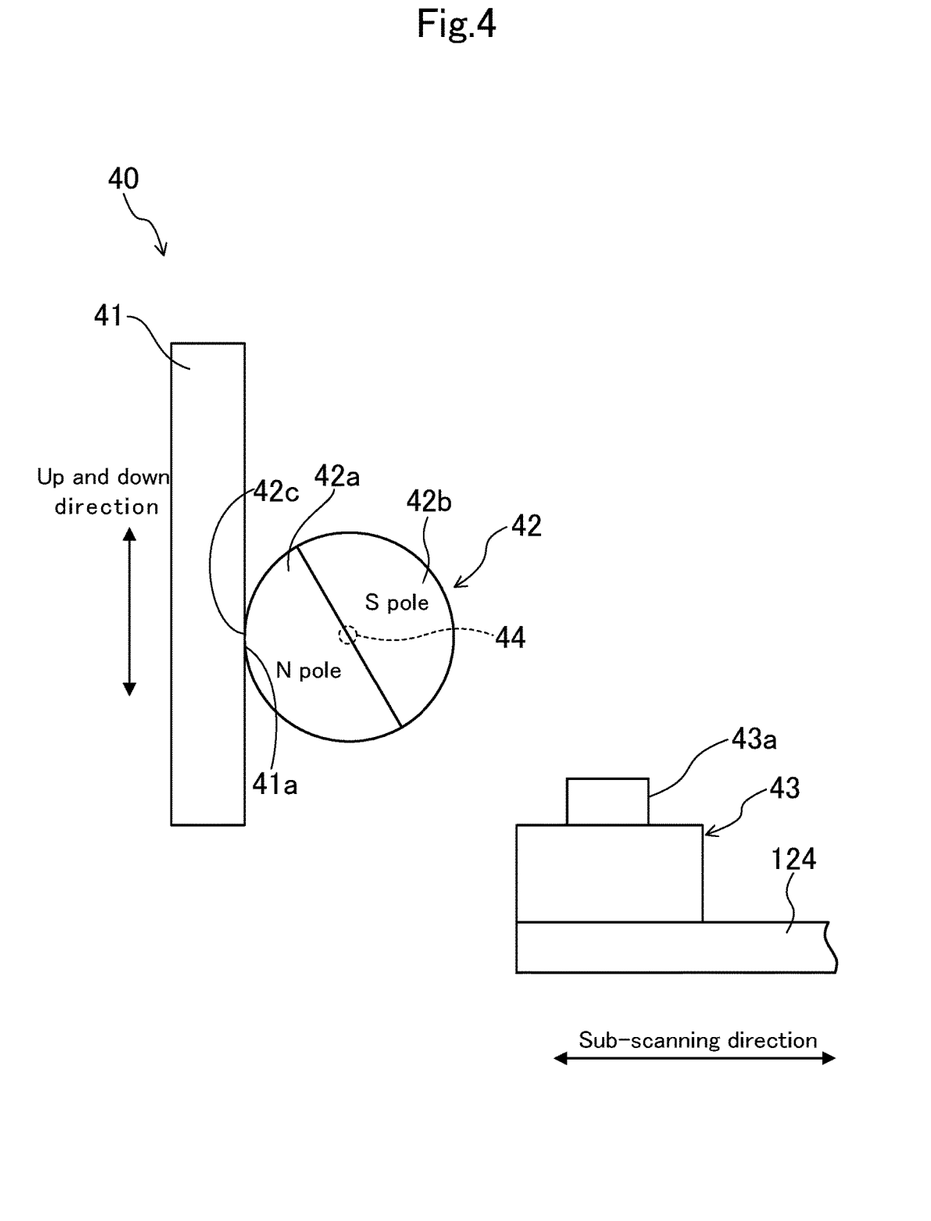
FIG. 4 is a diagram corresponding to FIG. 2, which illustrates a state in which a reading unit is separated from a home position and a document pressing cover is closed.

The magnetic sensor 43 is fixed to a support plate 124 protruding from the left side surface of the reading unit 12 (the first carriage 121). The magnetic sensor 43 has a magnetic detection part 43a facing the peripheral surface of the rotating magnet unit 42 at a predetermined interval when the reading unit 12 is in the home position. The magnetic detection part 43a faces the magnetic pole 42a of the N pole when the ADF 2 is in the closed state as illustrated in FIG. 2. When the ADF 2 is changed from the closed state to the opened state, the interlocking bar 41 moves up and the rotating magnet unit 42 rotates in the clockwise direction of FIG. 2. As a consequence, the magnetic detection part 43a faces the magnetic pole 42b of the S pole of the rotating magnet unit 42 as illustrated in FIG. 3. As illustrated in FIG. 4, when the reading unit 12 moves to the aforementioned moving end side from the home position, the magnetic detection part 43a is separated to a position in which the magnetic detection part 43a does not face the peripheral surface of the rotating magnet unit 42.

The magnetic sensor 43 outputs an N pole detection signal in the state in which the magnetic detection part 43a faces the magnetic pole 42a of the N pole of the rotating magnet unit 42, and outputs a S pole detection signal in the state in which the magnetic detection part 43a faces the magnetic pole 42b of the S pole of the rotating magnet unit 42. Furthermore, the magnetic sensor 43 outputs a non-detection signal when the magnetic sensor 43 is separated to a position, in which the magnetic sensor 43 does not face the peripheral surface of the rotating magnet unit 42, and a distance from the peripheral surface is equal to or more than a predetermined distance.

The signals outputted from the magnetic sensor 43 are outputted to the controller 4. The controller 4 detects the home position of the reading unit 12 and the opening and closing state of the ADF 2 on the basis of the signals received from the magnetic sensor 43.

Figure 5:
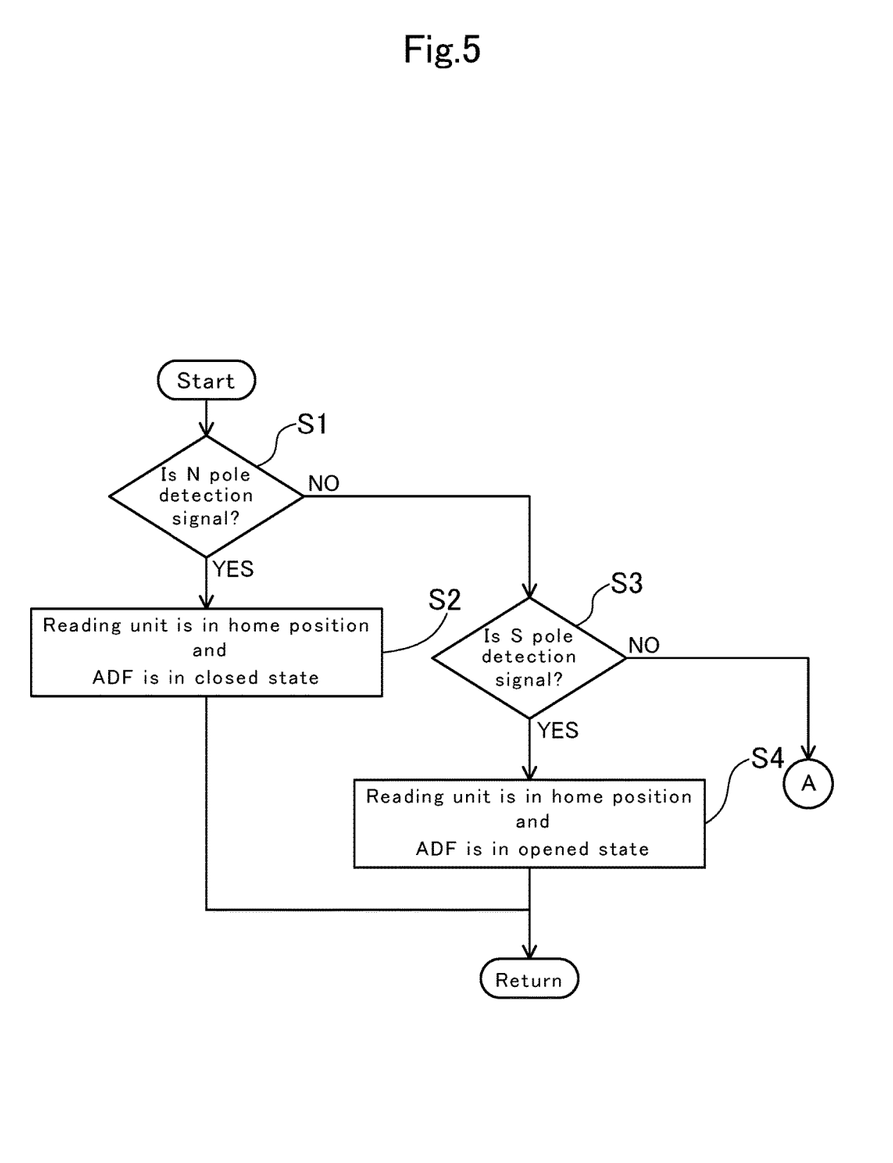
FIG. 5 is a first half part of a flowchart illustrating content of detection control performed by a controller.
Figure 6:
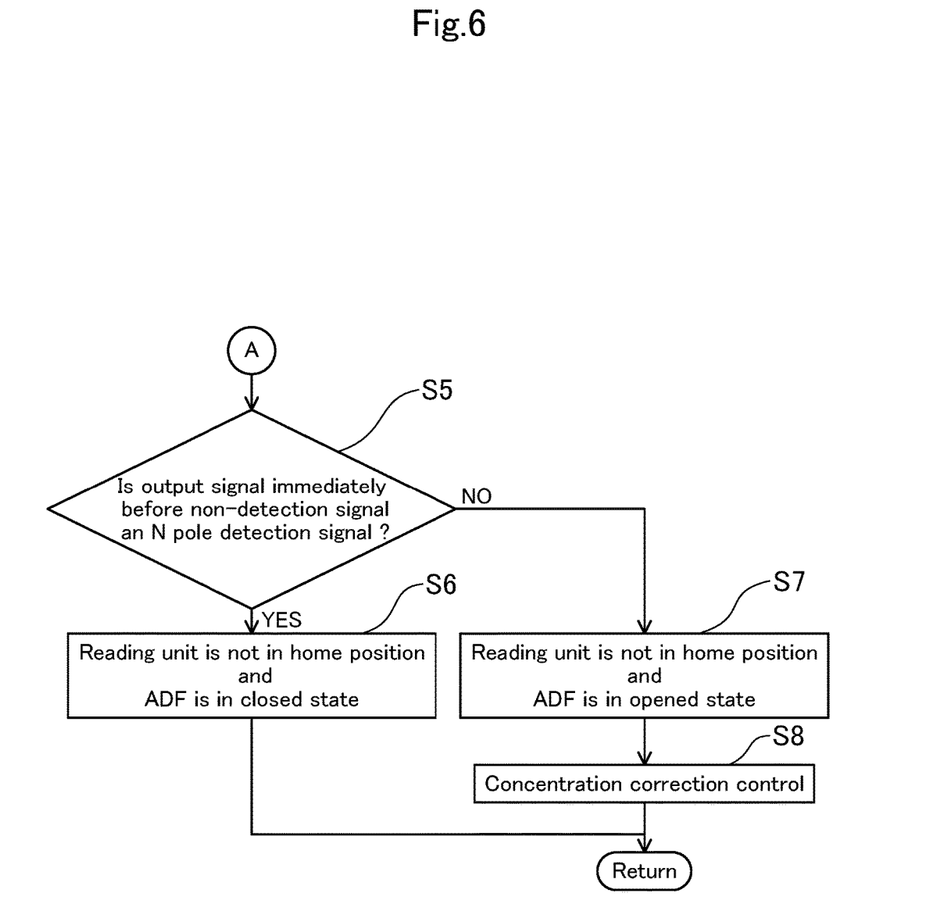
FIG. 6 is a latter half part of a flowchart illustrating content of detection control performed by a controller.

FIG. 5 and FIG. 6 are flowcharts illustrating the content of the detection control in the controller 4.

In step S1, the controller 4 determines whether an output signal from the magnetic sensor 43 is the N pole detection signal. When the determination is NO, the controller 4 proceeds to step S3, and when the determination is YES, the controller 4 proceeds to step S2.

In step S2, the controller 4 determines that the reading unit 12 is in the home position and the ADF 2 is in the closed state (the state of FIG. 2), and then returns.

In step S3 which is performed when the determination of step S1 is NO, the controller 4 determines whether the output signal from the magnetic sensor 43 is the S pole detection signal. When the determination is NO, the controller 4 proceeds to step S5, and when the determination is YES, the controller 4 proceeds to step S4.

In step S4, the controller 4 determines that the reading unit 12 is in the home position and the ADF 2 is in the opened state (the state of FIG. 3), and then returns.

In step S5 which is performed when the determination of step S3 is NO, the controller 4 determines that the output signal from the magnetic sensor 43 is the non-detection signal and identifies an output signal immediately before the output signal from the magnetic sensor 43 is changed to the non-detection signal. Then, the controller 4 determines whether the identified immediately previous signal is the N pole detection signal. When the determination is NO, the controller 4 proceeds to step S7, and when the determination is YES, the controller 4 proceeds to step S6.

In step S6, the controller 4 determines that the reading unit 12 is not in the home position and the ADF 2 is in the closed state, and then returns.

In step S7 which is performed when the determination of step S5 is NO, the controller 4 determines that the reading unit 12 is not in the home position and the ADF 2 is in the opened state.

In step S8, the controller 4 performs image processing for reducing an influence of disturbance light incident on the second contact glass 11b. In an example of the image processing, concentration is adjusted such that the surrounding of a document image read by the CCD sensor 16 is not filled in black, or a luminance value of the document image read by the CCD sensor 16 is corrected to be lower by only an increase in a luminance value by the disturbance light.

As described above, on the basis of the output signals from the magnetic sensor 43, the controller 4 determines whether the ADF 2 is in the opened state or the closed state and determines whether the reading unit 12 is in the home position. Consequently, since it is not necessary to separately provide a detection sensor for detecting the opening and closing state of the ADF 2 and a detection sensor for detecting the home position of the reading unit 12, the number of sensors required is reduced, so that it is possible to reduce product cost.

Furthermore, since the magnetic sensor 43 consumes lower power than a PI sensor and the like, it is possible to improve energy saving.

When an output signal from the magnetic sensor 43 is the non-detection signal, the controller 4 determines that the reading unit 12 is not in the home position, identifies an output signal of the magnetic sensor 43 immediately before the output signal of the magnetic sensor 43 is changed to the non-detection signal, and determines an opening and closing state of the ADF 2 corresponding to the identified output signal as an opening and closing state of a current time point (steps S5 to S7).

In the determination process, the opening and closing state of the ADF 2 is determined (estimated) focusing on the fact that a user less likely to open and close the ADF 2 while the reading unit 12 is moving away from the home position. In this way, it is possible to accurately determine the opening and closing state of the ADF 2 by one magnetic sensor 43 without an increase in the number of sensors.

Furthermore, the detection device 40 includes the interlocking bar 41 that extends in the up and down direction and operates in interlock with the opening and closing of the ADF 2, wherein the interlocking bar 41 is formed with the gear part 41a, which includes a plurality of teeth arranged in the up and down direction, and the rotating magnet unit 42 is formed on the outer peripheral surface thereof with the gear part 42c engaged with the gear part 41a of the interlocking bar 41. According to this configuration, it is possible to allow the rotating magnet unit 42 to operate in interlock with the opening and closing operation of the ADF 2 by a simple configuration.

Other Embodiments

The present invention may have the following configuration with respect to the aforementioned embodiment.

Figure 7:
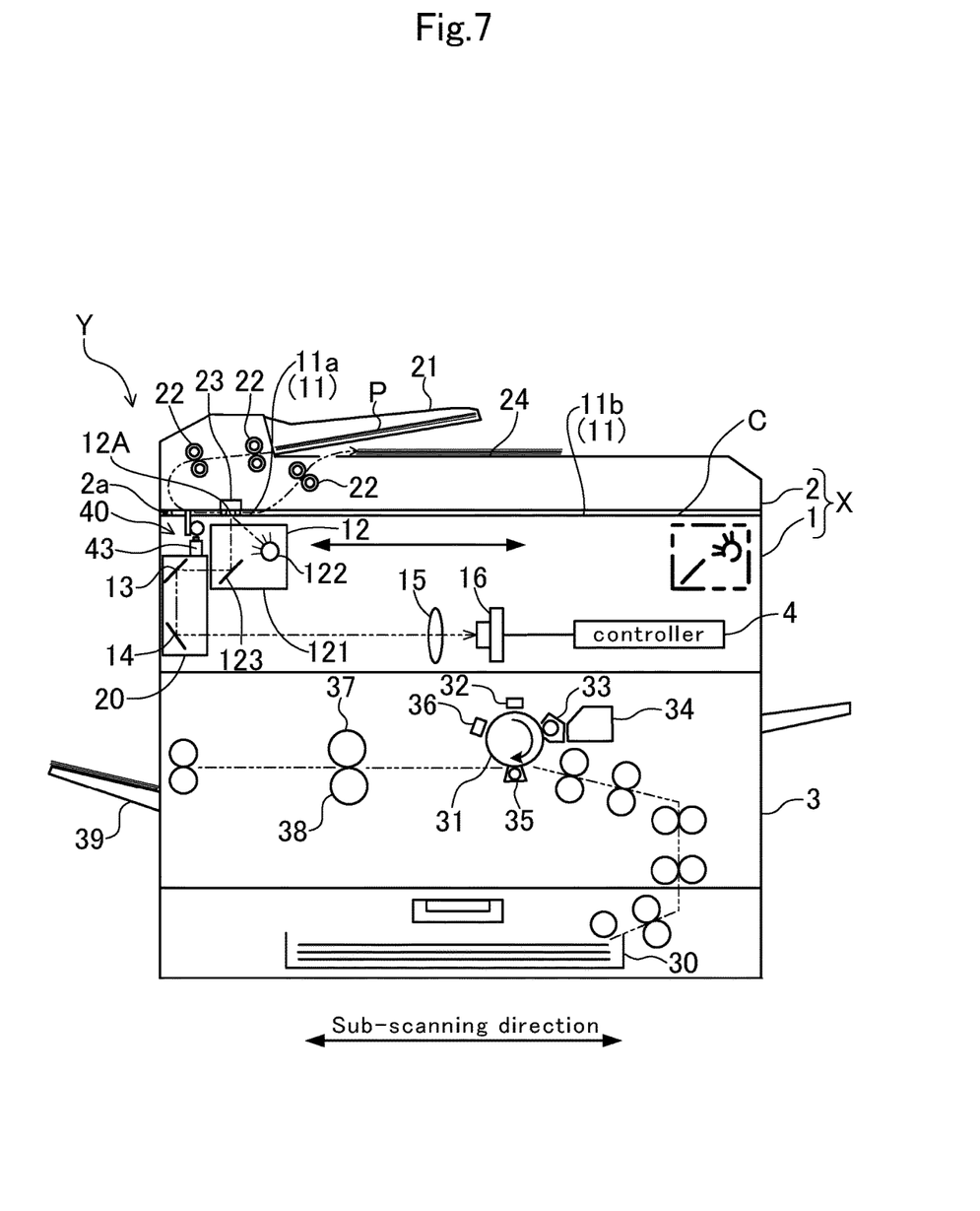
FIG. 7 is a diagram corresponding to FIG. 1, which illustrates another embodiment.

That is, in the aforementioned embodiment, the magnetic sensor 43 is fixed to the support plate 124 protruding from the side surface of the reading unit 12; however, the present invention is not limited thereto and for example, as illustrated in FIG. 7, the magnetic sensor 43 may be installed at the second carriage (the movable body) 20 that moves in the sub-scanning direction in interlock with the reading unit 12.

In the aforementioned embodiment, when the controller 4 determines that the reading unit 12 is in the home position and the ADF 2 is in the opened state in step S4, automatic sheet feeding by the ADF 2 may be prohibited.

In the aforementioned embodiment, an example, in which the magnetic detection part 43a of the magnetic sensor 43 faces the peripheral surface of the rotating magnet unit 42 when the reading unit 12 is in the home position, has been described; however, the present invention is not limited thereto and the magnetic detection part 43a may face a side surface in the thickness direction of the rotating magnet unit 42.

In the aforementioned embodiment, an example, in which the home position of the reading unit 12 is directly below the first contact glass 11a, has been described; however, the present invention is not limited thereto and when the reading unit 12 is in the home position, it is sufficient if the magnetic sensor 43 and the peripheral surface of the rotating magnet unit 42 face each other, and for example, the home position of the reading unit 12 may be set between the first contact glass 11a and the second contact glass 11b.

In the aforementioned embodiment, an example, in which when the ADF 2 is in the closed state, the magnetic detection part 43a faces the magnetic pole 42a of the N pole and when the ADF 2 is in the opened state, the magnetic detection part 43a faces the magnetic pole 42b of the S pole, has been described; however, it may be possible to allow the magnetic detection part 43a to face the magnetic pole 42a of the N pole when the ADF 2 is in the opened state, and to allow the magnetic detection part 43a to face the magnetic pole 42b of the S pole when the ADF 2 is in the closed state.

INDUSTRIAL APPLICABILITY

As described above, the present invention is useful for an image reading device and an image forming apparatus including the same.

The invention claimed is:
1. An image reading device including a scanner housing, a contact glass mounted on an upper surface of the scanner housing, a reading unit, which is received in the scanner housing, is installed with a light source for emitting light toward a document on the contact glass, and reciprocally moves between a predetermined home position and a predetermined moving end, and a document pressing unit, which is opened and closed with respect to an upper surface of the contact glass and is closed to press the document on the contact glass, the image reading device comprising:
   a rotating magnet unit that rotates in interlock with opening and closing of the document pressing unit and has a magnetic pole of an N pole and a magnetic pole of a S pole disposed at different phase positions in a rotation direction; and
   a magnetic sensor having a magnetic detection part that is installed in the reading unit or a movable body moving in a sub-scanning direction in interlock with the reading unit, and faces a surface of the rotating magnet unit only when the reading unit is in the predetermined home position,
   wherein the magnetic poles of the N pole and the S pole of the rotating magnet unit are provided such that a polarity of the magnetic pole of the N pole or the S pole facing the magnetic detection part is different between when the document pressing unit is in a closed state and when the document pressing unit is in an opened state in a state in which the reading unit is in the predetermined home position, and the image reading device further comprises:
a determination unit that determines an opening and closing state of the document pressing unit and determines whether the reading unit is in the predetermined home position on the basis of an output signal from the magnetic sensor.

2. The image reading device of claim 1, wherein the magnetic sensor is configured to output an N pole detection signal in a state in which the magnetic detection part faces the magnetic pole of the N pole, output a S pole detection signal in a state in which the magnetic detection part faces the magnetic pole of the S pole, and output a non-detection signal in a state in which the magnetic detection part is separated from the surface of the rotating magnet unit by a predetermined distance or more, and
when the output signal of the magnetic sensor is the non-detection signal, the determination unit determines that the reading unit is not in the predetermined home position, identifies an output signal of the magnetic sensor immediately before the output signal of the magnetic sensor is changed to the non-detection signal, and determines an opening and closing state of the document pressing unit corresponding to the identified output signal as an opening and closing state of a current time point.

3. The image reading device of claim 1, further comprising:
an interlocking bar that moves in an up and down direction in interlock with opening and closing of the document pressing unit,
wherein the interlocking bar is formed with a gear part including a plurality of teeth arranged in the up and down direction, and the rotating magnet unit is formed on an outer peripheral surface thereof with a gear part engaged with the gear part of the interlocking bar.

4. An image forming apparatus comprising the image reading device of claim 1.

* * * * *